(12) United States Patent  
Sakamoto

(10) Patent No.: US 9,197,811 B2  
(45) Date of Patent: Nov. 24, 2015

(54) RECORDING OPERATION CONTROL DEVICE FOR CAMERA

(71) Applicant: PENTAX RICOH IMAGING COMPANY, LTD., Tokyo (JP)

(72) Inventor: Yoshihide Sakamoto, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 133 days.

(21) Appl. No.: 13/900,870

(22) Filed: May 23, 2013

(65) Prior Publication Data

US 2013/0329083 A1 Dec. 12, 2013

(30) Foreign Application Priority Data

Jun. 7, 2012 (JP) ................................ 2012-129688

(51) Int. Cl.
H04N 5/232 (2006.01)
H04N 1/21 (2006.01)
G03B 17/40 (2006.01)

(52) U.S. Cl.
CPC ............ *H04N 5/23229* (2013.01); *G03B 17/40* (2013.01); *H04N 1/2158* (2013.01)

(58) Field of Classification Search
CPC ... H04N 5/23229; H04N 7/188; H04N 5/232; G03B 17/40

USPC ........ 348/222.1, 231.99, 231.1, 231.2, 231.7, 348/231.8

See application file for complete search history.

(56) References Cited

U.S. PATENT DOCUMENTS

| 6,002,436 A * | 12/1999 | Anderson ...................... 348/372 |
| 8,920,331 B2 * | 12/2014 | Ouchi et al. .................. 600/500 |
| 2004/0183921 A1* | 9/2004 | Ueda ........................... 348/222.1 |
| 2009/0262216 A1* | 10/2009 | Sasaki ......................... 348/231.7 |
| 2011/0242360 A1 | 10/2011 | Mori |

FOREIGN PATENT DOCUMENTS

JP 2011-217088 10/2011

* cited by examiner

*Primary Examiner* — Ahmed A Berhan
(74) *Attorney, Agent, or Firm* — Greenblum & Bernstein P.L.C.

(57) ABSTRACT

A recording operation control device for a camera, which can perform time-lapse photography at a predetermined time interval, comprises an external memory control unit and an image data writing unit. The external memory control unit opens or closes a file defined in the external memory, which is detachably attached to the camera body, when image data is recorded in the external memory. The image data writing unit can write image data to an internal memory and the external memory. The external memory control unit maintains the open state of the file, and the image data writing unit records image data in the external memory without storing it in the internal memory, when the time interval is shorter than the processing time.

10 Claims, 5 Drawing Sheets

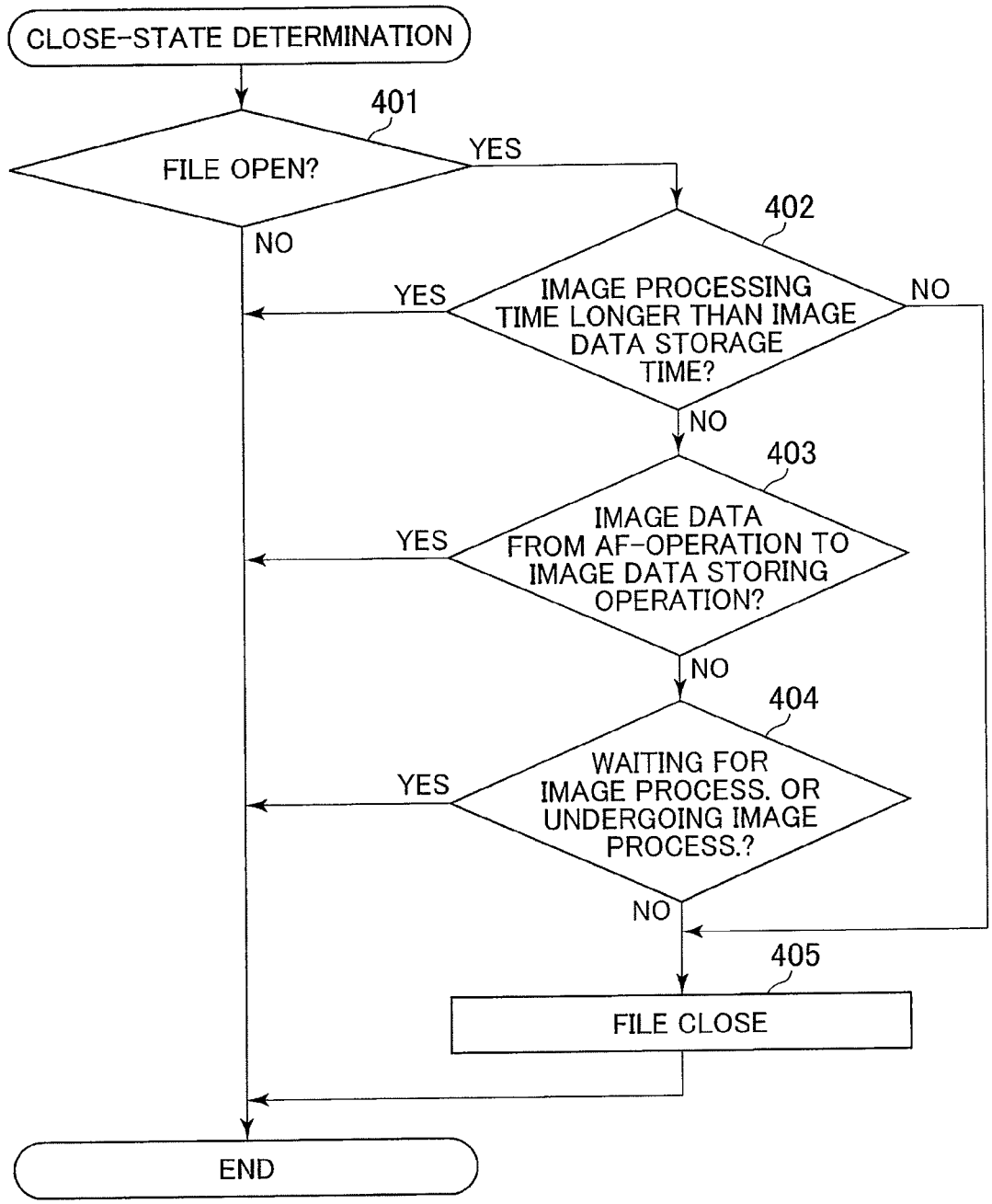

RECORDING OPERATION CONTROL DEVICE FOR CAMERA

BACKGROUND OF THE INVENTION

1. Field of the Invention

The present invention relates to a camera by which time-lapse photography can be performed, and more particularly to a device for controlling a recording operation of image data in an external memory such as a memory card detachably attached to the camera.

2. Description of the Related Art

Conventionally, a technology is known in which time-lapse photography is performed and moving image data is recorded in a file of an external memory such as a memory card, as disclosed in US-2011-242360-A1. The external memory is usually controlled to open the file only when a recording operation is carried out, and when a recording operation is not carried out, the file remains closed so that image data recorded in the file does not get corrupted. Namely, in a conventional time-lapse photography, the file is opened and the image data is recorded in the file, and the file is then closed. Thus, opening and closing operations of the file are repeated every time image data is recorded in the file.

If the opening and closing of the file in the external memory are repeated in time-lapse photography, it becomes difficult to perform the process for opening and closing along with the image processing of the image data when the time interval of the photography is short, such as 1 second. Thus, time-lapse photography could not be performed at a short time interval.

SUMMARY OF THE INVENTION

Therefore, an object of the present invention is to provide a recording operation control device for a camera, by which time-lapse photography at a short time interval is easily carried out.

According to the present invention, a recording operation control device for a camera, which can perform time-lapse photography at a predetermined time interval, comprises an internal memory, an external memory, an external memory control unit, a time measurement unit, and an image data writing unit. The internal memory is housed in the camera body. The external memory is detachably attached to the camera body. The external memory control unit opens or closes a file defined in the external memory when recording image data in the external memory. The time measurement unit measures a processing time from the start of a photographing operation for a single image to the completion of an image-processing operation on image data obtained by the photographing operation. The image data writing unit can write image data to the internal memory and the external memory. The external memory control unit maintains the open state of the file, and the image data writing unit records image data in the external memory without storing it in the internal memory when the time interval is shorter than the processing time.

Further, according to the present invention, a recording operation control device for a camera, which can perform time-lapse photography at a predetermined time interval, comprises an external memory, an external memory control unit, and an image data writing unit. The external memory is detachably attached to the camera body. The external memory control unit opens or closes a file defined in the external memory when recording image data in the external memory. The image data writing unit can write image data to the external memory. The external memory control unit maintains the open state of the file when image data regarding an image obtained in said time-lapse photography exists and has not been subject to image processing, so that the image data writing unit can record the image data in the external memory.

BRIEF DESCRIPTION OF THE DRAWINGS

The object and advantages of the present invention will be better understood from the following description, with reference to the accompanying drawings in which:

FIG. 5 is a flowchart showing a close-state determination process.

DESCRIPTION OF THE PREFERRED EMBODIMENTS

Figure 1:
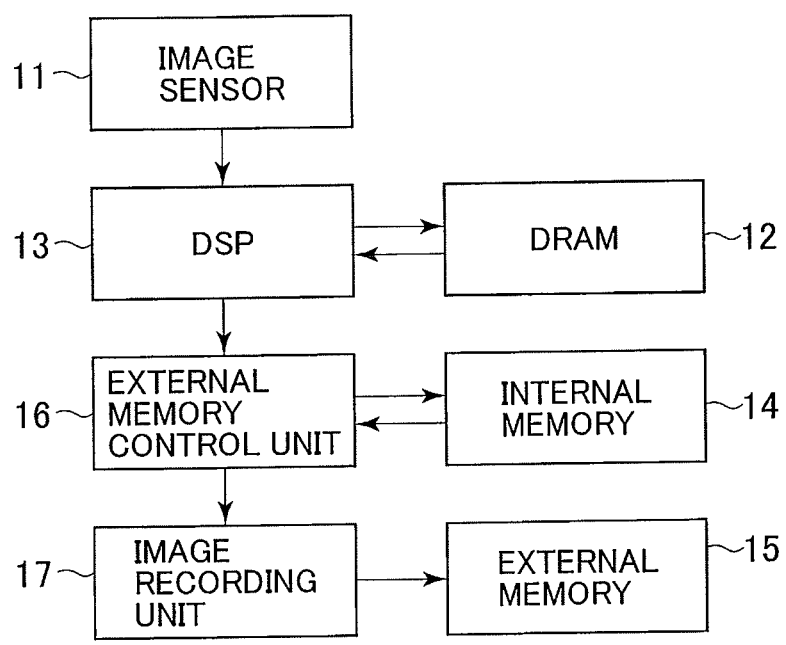
FIG. 1 is a block diagram showing a general structure of a single-lens reflex digital camera, to which an embodiment of the present invention is applied.

The embodiments of the present invention will be described below with reference to the drawings. FIG. 1 shows a basic electric diagram of a single-lens reflex digital camera, to which an embodiment of the present invention is applied. This camera can perform time-lapse photography at a predetermined time interval. In this camera, an image signal detected by an image sensor 11 is transformed into digital data, which is then temporally written to a DRAM 12. The image data is read out from the DRAM 12 and subjected to predetermined image processing by a digital signal processor (DSP) 13. The image data subjected to the image processing is written to an internal memory 14 or an external memory (memory card) 15. The internal memory 14 is housed in the camera body, and the external memory 15 is detachably attached to the camera body.

An external memory control unit 16 determines that when image data (i.e., frame) subjected to image processing by the DSP 13 is recorded in the external memory 15 in time-lapse photography, the image data is directly recorded in the external memory 15 or is temporarily stored in the internal memory 14 before being recorded in the external memory 15. The image data is recorded in the external memory 15 through an image recording unit 17. The determination process carried out by the external memory control unit 16 will be described later.

Figure 2:
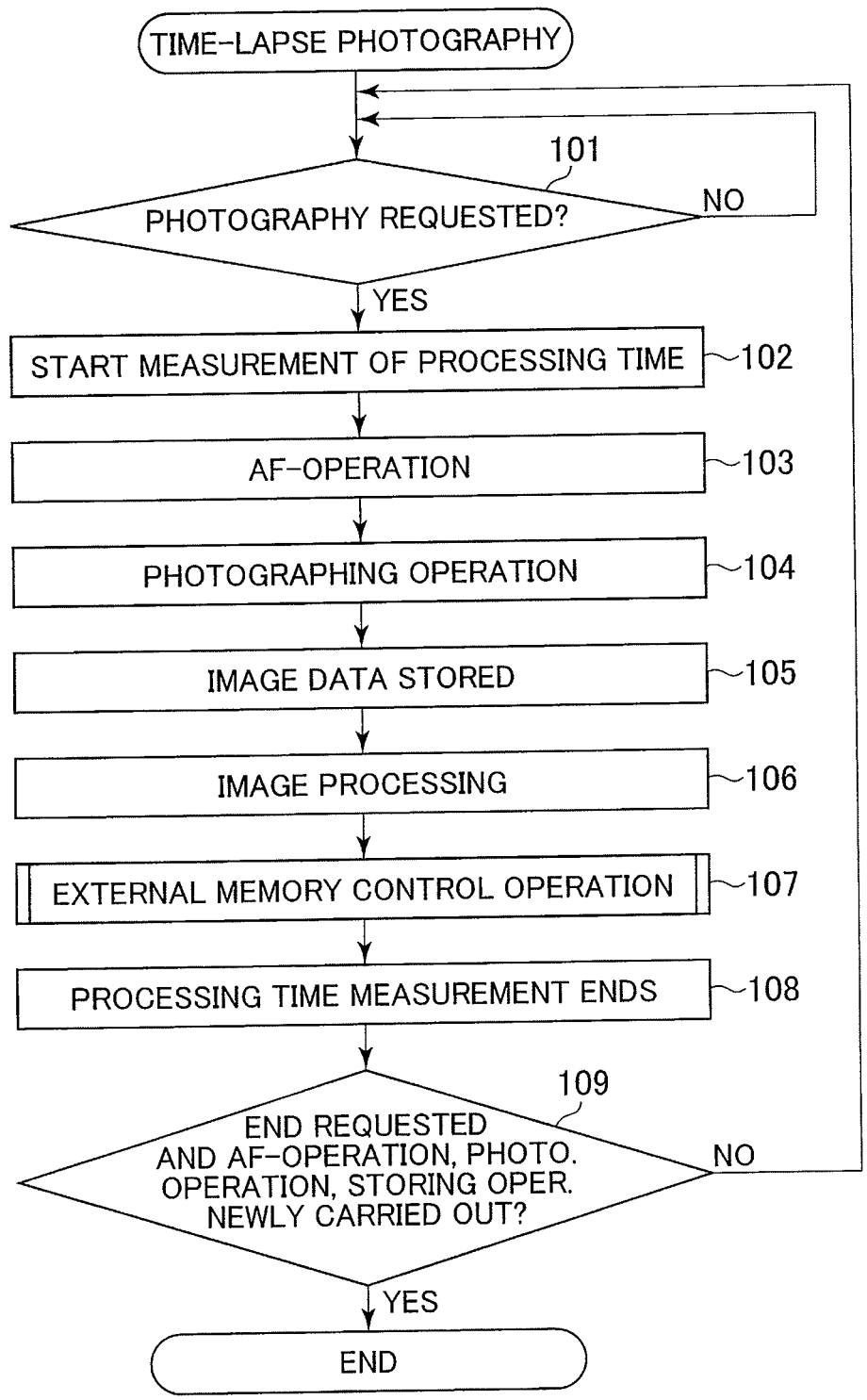
FIG. 2 is a flowchart of a basic operation of time-lapse photography.

FIG. 2 is a flowchart of a basic operation of time-lapse photography. The time-lapse photography is a photographing mode, in which a plurality of still images taken at a predetermined time interval is recorded as a single file. In Step 101, it is determined whether a command signal for requesting photography has been output by a CPU (not shown) or the DSP. When a user fully depresses the shutter button the photography command signal is generated for the first frame in time-lapse photography, and is re-generated at every predetermined time interval (e.g., 1 second) of the time-lapse photography in a photographing operation for the second and following frames. When the command signal for photography is received, the process goes to Step 102, in which a measurement of a processing time described below is started by a counter provided in the DSP 13.

In Step 103, an AF-operation is carried out, in which a focal adjustment of an object image is performed using an AFsensor (not shown). In Step 104, a photographing operation is carried out, in which the mirror is moved up, and a shuttering operation is performed to expose the image sensor 11. In Step 105, an image signal generated in the image sensor 11 is read out and transformed into digital data, which is stored in the DRAM 12. In Step 106, the image data is read out from the DRAM 12 and subjected to image processing by the DSP 13.

In Step 107, an external memory control operation (see FIG. 3) described later is performed, so that it is determined whether image data subjected to image processing is stored in the internal memory 14 or recorded in the external memory 15. In Step 108, the measurement of the processing time started in Step 102 ends. Namely, the processing time is the elapsed time from the start of a photographing operation for a single image to the completion of storage of image data obtained by the photographing operation in the internal memory 14 or the external memory 15.

In Step 109, it is determined whether the time-lapse photography is to be continued. When a request for finishing the photography is output from the CPU, and not one of an AF-operation (Step 103), a photographing operation (Step 104), an image data storing operation (Step 105), or an image processing (Step 106) are newly carried out, it is determined that the time-lapse photography ends. Conversely, when it is determined that the time-lapse photography is to be continued, the process goes back to Step 101, so that the operations described above are repeated.

Figure 3:
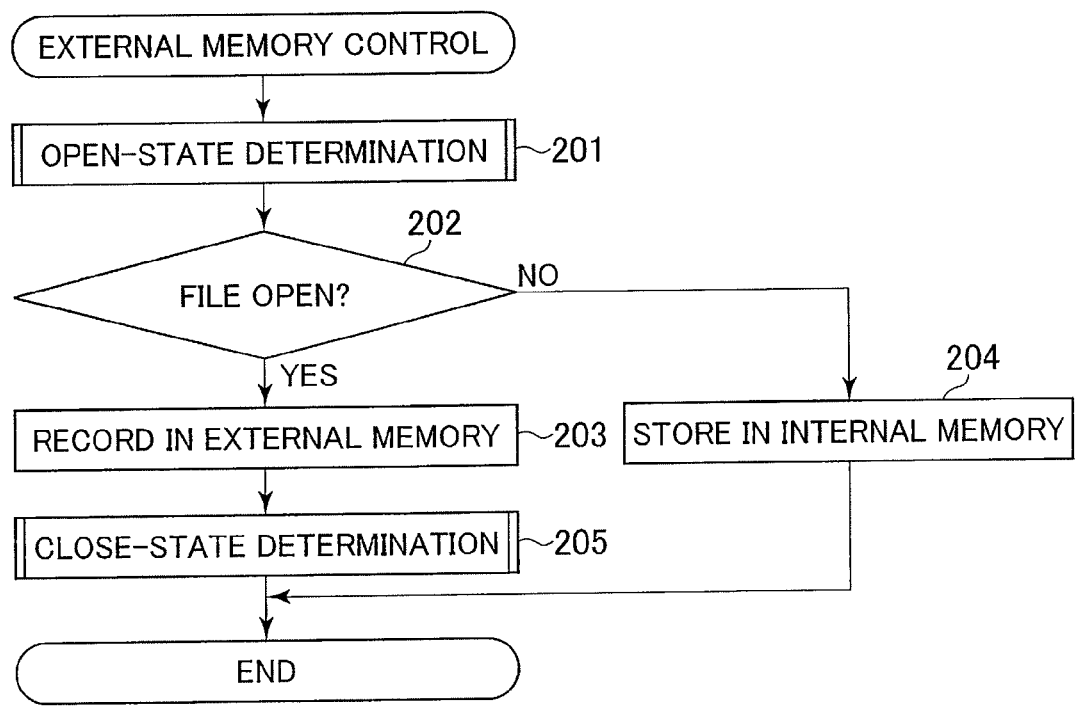
FIG. 3 is a flowchart showing an external memory control operation.

With reference to FIG. 3, an operation of the external memory control performed by the external memory control unit 16 is described below.

In Step 201, an open-state determination process (see FIG. 4) described later is carried out, in which it is determined whether or not a file defined in the external memory 15 is to be opened when recording image data in the external memory 15. The file is opened when predetermined conditions are satisfied. When it is determined in Step 202 that the file is opened, Step 203 is executed to record the image data in the external memory 15. Conversely, when it is determined in Step 202 that the file remains closed, Step 204 is executed to store the image data in the internal memory 14.

When Step 204 is executed, the operation of the external memory control immediately ends. Conversely, when Step 203 is executed, the process goes to Step 205, in which a close-state determination process (see FIG. 5) described later is carried out. Namely, it is determined whether or not the file of the external memory 15 is to be closed, in which, when predetermined conditions are satisfied, the file is closed, and when the predetermined conditions are not satisfied, the external memory control ends while the file remains open.

Figure 4:
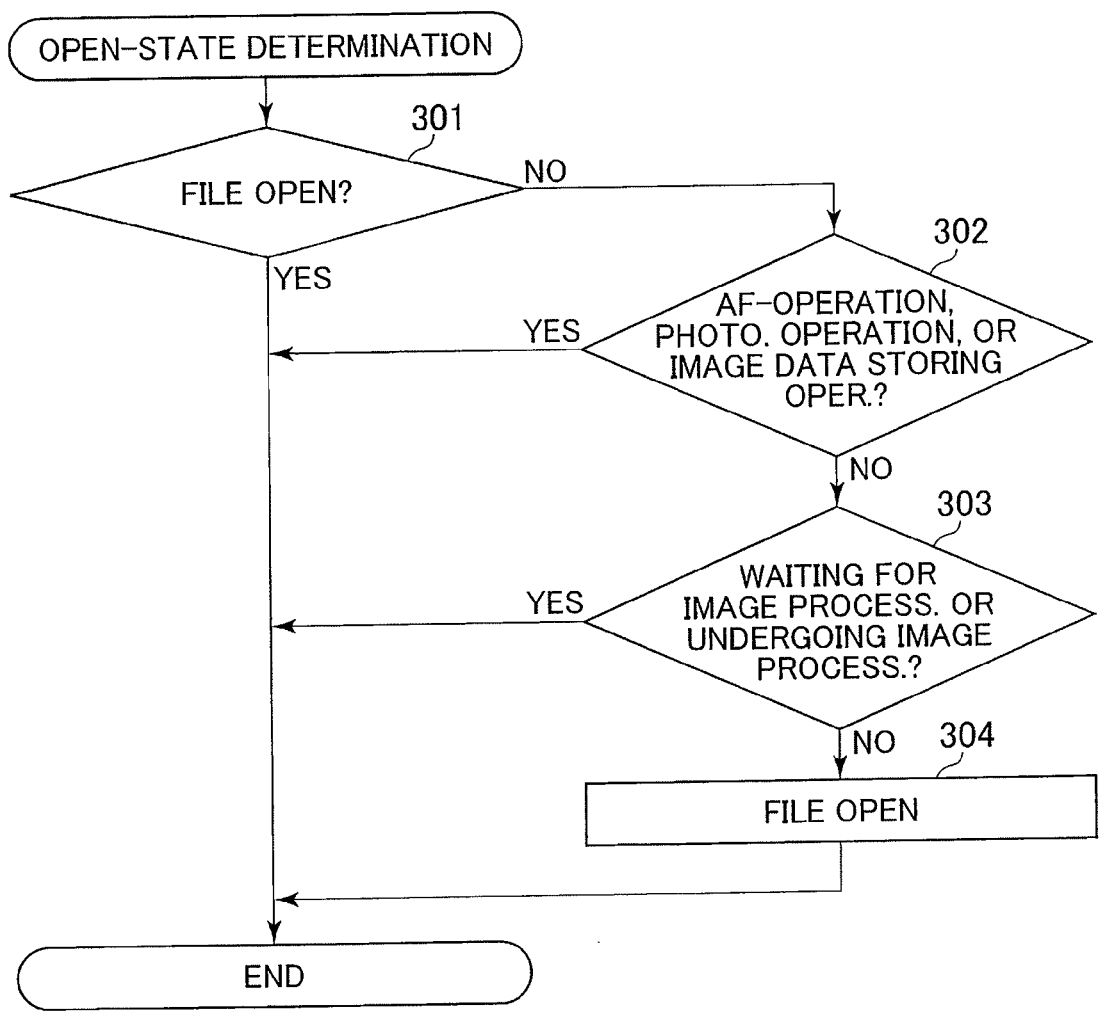
FIG. 4 is a flowchart showing an open-state determination process.

FIG. 4 is a flowchart showing the open-state determination process, in which it is determined whether or not the file should be opened.

In Step 301, it is determined whether or not the file of the external memory 15 is open. When the file is open, the open-state determination process immediately ends.

Conversely, when the file is closed, the process goes to step 302, in which it is determined whether the present state is the AF-operation (Step 103 of FIG. 2), the photographing operation (Step 104 of FIG. 2), or the image data storing operation (Step 105 of FIG. 2). In other words, it is determined whether or not the present state is anywhere between the start of an AF-operation of the present photographing operation and the completion of an operation, in which an image signal is read out from the image sensor 11 and the image data (i.e., frame) is stored in the DRAM 12. When the present state is within the range from Step 103 to Step 105 of FIG. 2, it is determined that the file should not be opened, and the operation of the open-state determination immediately ends, so that the file remains closed. Thus, when the present state is midway through a photographing operation and a writing operation to write image data to the DRAM 12 has not been completed, the file remains closed since it is not necessary to access to the external memory 15.

When it is determined in Step 302 that the image data has been written to the DRAM 12, Step 303 is executed, in which it is determined whether or not the DRAM 12 holds any image data, which is waiting for image processing (Step 106 of FIG. 2) or undergoing image processing in the DSP 13. That is, it is determined in Step 303 whether any image data exists and is either waiting for image processing or undergoing image processing. Thus, when image data exists and is either waiting for image processing or undergoing image processing even after the completion of the reading operation of the image signal from the image sensor 11, it is determined that the file should not be opened since there is no need to access the external memory 15, and the open-state determination process immediately ends so that the file remains in the closed state.

Conversely, when it is determined in Step 303 that there is not any image data waiting for image processing or undergoing image processing, that is, when it is determined that image processing has been completed for all of the image data which has been obtained up to now, the process goes to Step 304, in which the file of the external memory 15 is opened. That is, it is determined, while the file is closed, that the file of the external memory 15 should be opened if operations from an AF-operation to an image-processing operation in the DSP 12 have been completed. At this point, the open-state determination process ends.

FIG. 5 is a flowchart showing a close-state determination process, in which it is determined whether or not the file should be closed.

In Step 401, it is determined whether the file of the external memory 15 is opened or closed. When the file is closed, the operation of the close-state determination immediately ends.

Conversely, when the file is opened, the process goes to Step 402, in which it is determined whether or not the image processing time is longer than the image data storage time. The image processing time is the time consumed during image processing of image data obtained in a previous photographing operation, and more specifically, the elapsed time from the start of an AF-operation (Step 103 of FIG. 2) to the completion of a storage operation of image data in the internal memory 14 or the external memory 15 (Step 107 of FIG. 2). Data corresponding to the length of the image processing time is recorded in the DRAM 12, for example. The image data storage time is the time interval (e.g., 1 second) of the time-lapse photography. When it is determined in Step 402 that the image processing time is shorter than the time interval of the time-lapse photography, it is determined that the file should be closed since it is not necessary to access the external memory 15. Namely, the file is closed in Step 405, and thus, the close-state determination process ends.

When it is determined in Step 402 that the image processing time is longer than the time interval of the time-lapse photography, Step 403 is executed, in which it is determined in a similar way as Step 302 of FIG. 4 whether the present state is the AF-operation, the photographing operation, or the image data storing operation. In other words, it is determined whether or not the present state is anywhere from the start of an AF-operation of the present photographing operation to the completion of an operation, in which an image signal is read out from the image sensor 11 and the image data is stored in the DRAM 12. When the present state is anywhere between the start of the AF-operation and the completion of the storage operation of the image data into the DRAM 12, it is determined that the file should not be closed and the close-state determination process immediately ends so that the file remains open. Thus, when the present state is midway through a photographing operation and a writing operation to write image data to the DRAM 12 has not been completed, the file remains in the open state since access to the external memory 15 becomes necessary after image processing is completed.

When it is determined in Step 403 that the writing operation of the image data to the DRAM 12 has been completed, Step 404 is executed, in which it is determined in a similar manner as Step 303 of FIG. 4 whether or not there is any image data either waiting for image processing or undergoing image processing. Namely, it is determined that the file should not be closed when image data exists and is either waiting for image processing or undergoing image processing even after the completion of the reading operation of an image signal from the image sensor 11, since access to the external memory 15 will be necessary after the image processing is completed. Thus, the close-state determination process immediately ends and the file remains in the open state.

Conversely, when it is determined in Step 404 that there is not any image data waiting for image processing or undergoing image processing, all the image data obtained up to now has undergone all processes up to and including image processing, and thus it is not necessary to access the external memory 15. Thus, Step 405 is executed, in which the file of the external memory 15 is closed. That is, it is determined, while the file is opened, that the file should be closed when image processing carried out by the DSP 13 has been completed. At this point, the close-state determination process ends.

As described above, in the embodiment, when the time interval of time-lapse photography is shorter than a processing time from the beginning of the photographing operation to the completion of the image processing of the image data (i.e., when the determination is "yes" in Step 402 of FIG. 5), the opened state of the file of the external memory is maintained if a photographing operation has been performed and image data exists for which image processing has not been completed (i.e., when the determination is "yes" in Step 403 or 404 of FIG. 5). After the image processing is completed, the image data is recorded in the external memory 15 without being stored in the internal memory 14. On the other hand, even if the time interval of time-lapse photography is shorter than the processing time up to the completion of image processing, the file of the external memory 15 is closed so that the image data is stored in the internal memory 14 after the image processing of the image data has been completed (i.e., Step 405 of FIG. 5).

Thus, the embodiment is configured to determine the opened and closed states of the file of the external memory 15 in accordance with the time interval of the time-lapse photography and the state of progress of the image processing operation, so that the image data subjected to image processing is stored in either the external memory 15 or the internal memory 14. Therefore, even if the time interval of the time-lapse photography is short, the image data can be properly recorded in the external memory 15, and further, the load carried by the CPU or the DSP is reduced.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2012-129688 (filed on Jun. 7, 2012) which is expressly incorporated herein, by reference, in its entirety.

The invention claimed is:

1. A recording operation control device for a camera which can perform time-lapse photography at a predetermined photographing time interval, said recording operation control device comprising:
an internal memory housed in the camera body;
an external memory detachably attached to the camera body;
an external memory controller that opens or closes a file defined in said external memory when recording image data in said external memory;
a time measurer that measures a processing time from the start of a photographing operation for a single image to the completion of an image-processing operation on image data obtained by said photographing operation; and
an image data writer that writes image data to said internal memory and said external memory;
said external memory controller maintaining the open state of said file, and said image data writer recording image data in said external memory without storing the image data in said internal memory, when said predetermined photographing time interval is shorter than said processing time.

2. The recording operation control device according to claim 1, wherein said external memory controller comprises an open-state determiner that determines whether or not said file should be opened;
said open-state determiner determining, while said file is closed, that said file should be opened when operations from an AF-operation to an image-processing operation have been completed.

3. The recording operation control device according to claim 2, wherein said open-state determiner determines, while said file is closed, that said file should not be opened from the start of an AF-operation of the present photographing operation to the completion of a reading operation of an image signal from an image sensor.

4. The recording operation control device according to claim 3, wherein said open-state determiner determines, while said file is closed, that said file should not be opened when image data is present and is either waiting for image processing or undergoing image processing even after the completion of said reading operation.

5. The recording operation control device according to claim 1, wherein the image data subject to the image processing is stored in said internal memory when said file is closed.

6. The recording operation control device according to claim 1, wherein said external memory controller comprises a close-state determiner that determines whether or not said file should be closed;
said close-state determiner determining, while said file is opened, that said file should be closed, if the time consumed during image processing of image data obtained in a previous photographing operation is shorter than said predetermined photographing time interval.

7. The recording operation control device according to claim 6, wherein said close-state determiner determines, while said file is opened, that said file should not be closed from the start of an AF-operation of the present photographing operation to the completion of a reading operation of an image signal from an image sensor, if the time consumed during image processing of image data obtained in a previous photographing operation is longer than said predetermined photographing time interval.

8. The recording operation control device according to claim 7, wherein said close-state determiner determines, while said file is opened, that said file should not be closed when image data is present and is either waiting for image processing or undergoing image processing even after the completion of said reading operation, if the time consumed during image processing of image data obtained in a previous photographing operation is longer than said predetermined photographing time interval.

9. A recording operation control device for a camera which can perform time-lapse photography in which a plurality of full frame photographing operations are performed at a predetermined photographing time interval, said recording operation control device comprising:
   an external memory detachably attached to the camera body;
   an external memory controller that opens or closes a file defined in said external memory when recording image data in said external memory; and
   an image data writer that writes image data to said external memory;
   said external memory controller maintaining the open state of said file when image data regarding an image obtained in said time-lapse photography is present and has not been subject to image processing, so that said image data writer can record said image data regarding another image obtained in the time lapse photography in said external memory.

10. The recording operation control device for a camera according to claim 9, wherein said external memory controller maintains the open state of said file after recording image data of a previous photographing operation, and said image data writer records image data of a subsequent photographing operation in said external memory without storing the image data in an internal memory of the camera when said predetermined photographing time interval is shorter than a processing time, said processing time comprising a time from a start of a photographing operation for a single image to a completion of the image processing of image data obtained by the photographing operation.

* * * * *